United States Patent
Huber

(10) Patent No.: US 9,179,652 B2
(45) Date of Patent: Nov. 10, 2015

(54) AUTOMATED WATER EXCHANGE FOR A BIRDBATH

(71) Applicant: John Barton Huber, Mainville, OH (US)

(72) Inventor: John Barton Huber, Mainville, OH (US)

( * ) Notice: Subject to any disclaimer, the term of this patent is extended or adjusted under 35 U.S.C. 154(b) by 146 days.

(21) Appl. No.: 13/803,626

(22) Filed: Mar. 14, 2013

(65) Prior Publication Data

US 2014/0116345 A1    May 1, 2014

Related U.S. Application Data

(60) Provisional application No. 61/795,855, filed on Oct. 26, 2012.

(51) Int. Cl.
*A01K 39/02* (2006.01)
*A01K 45/00* (2006.01)

(52) U.S. Cl.
CPC .................................. *A01K 45/002* (2013.01)

(58) Field of Classification Search
CPC ......... A01K 45/002; A01K 7/00; A01K 7/02; A01K 39/02; B05B 3/06; B05B 17/08
USPC ........ 119/69.5, 74; 239/16, 17, 22, 23, 225.1, 239/246, 248, 251, 261, 273, 279, 280
IPC ..................................... A01K 7/00, 7/02, 39/02
See application file for complete search history.

(56) References Cited

U.S. PATENT DOCUMENTS

| | | | |
|---|---|---|---|
| 1,962,840 A | | 6/1934 | Rives |
| 3,770,203 A | * | 11/1973 | Dyar .............................. 239/205 |
| 4,630,569 A | | 12/1986 | Dieleman |
| 4,718,606 A | * | 1/1988 | Genbrugge ................... 239/251 |
| 5,617,657 A | * | 4/1997 | Kahn ............................... 40/406 |
| 6,634,316 B2 | * | 10/2003 | Desatoff ...................... 119/69.5 |
| 6,640,747 B2 | * | 11/2003 | Reusche ...................... 119/69.5 |
| 7,011,041 B1 | | 3/2006 | Bradley |
| 8,261,695 B2 | | 9/2012 | Huber |
| 2003/0150929 A1 | * | 8/2003 | Simmons ........................ 239/17 |
| 2003/0168523 A1 | * | 9/2003 | Lin ................................ 239/251 |
| 2009/0277392 A1 | * | 11/2009 | Potter ......................... 119/69.5 |
| 2010/0095897 A1 | * | 4/2010 | Rowe ............................ 119/72 |
| 2011/0174226 A1 | * | 7/2011 | Huber .......................... 119/69.5 |

OTHER PUBLICATIONS

Paws Travels, "How to Keep Your Birdbaths and Fountains Clean", http://www.pawstravels.com/birdbath/howtokeepyourbirdbathsclean.html, downloaded Jan. 13, 2011.

(Continued)

*Primary Examiner* — Lisa Tsang
(74) *Attorney, Agent, or Firm* — Thomas E. Lees, LLC

(57) ABSTRACT

A water exchange device for cleaning a birdbath with a basin comprises a turret, a stationary mount, a first channel, a second channel, and an inlet channel. The turret is coupled to a center point such that the turret may rotate around the center point, and the mount mounts the turret of the water exchange device to the birdbath basin to be cleaned. Both the first and second channels include an aperture, and the inlet channel is coupled to the first and second channels such that when water flows into the inlet channel, the water flows out the apertures of the first and second channels into the basin. When the water does flow at a certain pressure, the turret rotates around the center point.

21 Claims, 7 Drawing Sheets

(56) References Cited

OTHER PUBLICATIONS

Bradley, Mike, "Self Cleaning Bird Bath.com Inc., Cleanest Water a Bird Can Get—The Self Cleaning Bird Bath Story", http://selfcleaningbirdbath.com/store/index.php?main_page=page_2, downloaded Jan. 13, 2011.

Bradley, Mike, "Self Cleaning Bird Bath.com Inc., Cleanest Water a Bird Can Get—Installation of Birdbath", http://selfcleaningbirdbath.com/store/index.php?main_page=page_4, downloaded Jan. 18, 2011.

Clark, James, "The Automatic Bird Bath", http://jamesmclark5.home.comcast.net/~jamesmclark5/Birdwatching/Bird_Bath.htm, Jun. 22, 2005.

Clark, James, "The Automatic Bird Bath—JC Blogs", http://jamesmclark.blogspot.com/2005/06/automatic-birdbath.html, Jun. 22, 2005.

\* cited by examiner

AUTOMATED WATER EXCHANGE FOR A BIRDBATH

CROSS REFERENCE TO RELATED APPLICATIONS

This application claims the benefit of U.S. Provisional Patent Application Ser. No. 61/795,855 filed Oct. 26, 2012, entitled "AUTOMATED WATER EXCHANGE FOR A BIRDBATH," the disclosure of which is hereby incorporated by reference.

BACKGROUND

Various aspects of the present invention relate generally to birdbaths and more specifically to the maintenance of birdbaths (e.g., to provide for the automatic cleaning and restoration of clean water within a birdbath bowl).

Many birdbaths include a shallow basin that is usually perched on a pedestal. The inside of the basin defines a hollow space that can be filled with water, either by a natural means such as rain or by artificial means such as a person filling the basin using water from a conventional garden hose. When the birdbath basin is full of water, birds may enjoy the birdbath for bathing or as a source of drinking water.

However, the water in a birdbath will likely become contaminated over time. For instance, water in a birdbath basin may become dirty over time due to birds washing themselves in the water or through bird excrement left in the water. Also, over time, scum, algae, and, other build-up may contaminate the water. Still further, the birdbath basin may become dirty due to leaves, twigs, pinecones, dirt and, other debris that have fallen into the birdbath basin.

BRIEF SUMMARY

According to aspects of the present invention, a water exchange device for cleaning a birdbath with a basin comprises a turret, a stationary mount, at least two channels (e.g., a first channel, and a second channel), and an inlet channel. The turret is coupled to a center point such that the turret may rotate around the center point, and the mount mounts the turret of the water exchange device to the birdbath basin to be cleaned. Both the first and second channels include an aperture, and the inlet channel is coupled to the first and second channels such that when water flows into the inlet channel, the water flows out the apertures of the first and second channels into the basin. When the water does flow at a certain pressure, the turret rotates around the center point.

DETAILED DESCRIPTION

According to various aspects of the present invention, a water exchange device for automated maintenance of a birdbath includes a turret that can rotate around a center point. The water exchange device maintains a clean birdbath basin and clean water within the basin using an exchange cycle, which includes: an emptying cycle with water at a certain pressure, and a refill cycle with water at a lower pressure than the emptying cycle. In both of these cycles of the exchange cycle, the water from the water exchange device does not scrub the basin to remove stains. Instead, the water exchange device (and associated kit) performs the exchange cycle up to six times per day at intervals of about three hours, which does not allow stains to form in the first place. In other words, the water exchange device is proactive in cleaning by preventing stains from occurring instead of being reactive by removing existing stains.

Birdbath basins include a rim, and on a contiguous basin, the lowest point on the rim defines a maximum water level, because if water is added past that level, that excess water will overflow from the basin. Within this disclosure, a "maximum water level surface" is defined as an imaginary plane within the basin of the birdbath at the maximum water level, but does not require actual water to be in the basin itself.

Figure 1:
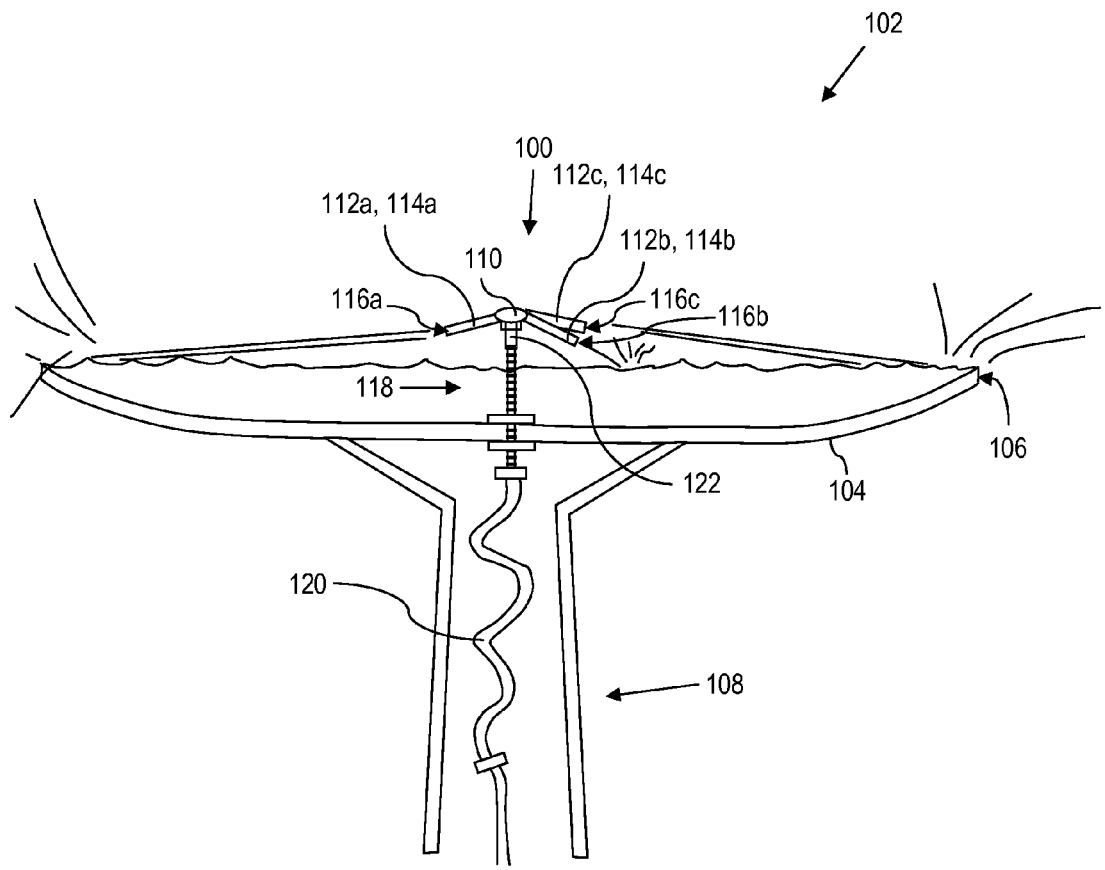
FIG. 1 is side view of a water exchange device mounted on a birdbath, according to various aspects of the present disclosure.

Turning now to the figures and in particular to FIG. 1, a water exchange device 100 is shown mounted on a birdbath 102 that includes a basin 104 with a rim 106 mounted on a hollow pedestal 108. The water exchange device 100 includes a turret 110 with three tubular armatures 112a-c forming channels 114a-c with apertures 116a-c. While three channels 114a-c are depicted in the example water exchange device 100 of FIG. 1, the number of channels 114 may be any number two or greater. Further, the channels 114a-c of the example water exchange device 100 are shown as tubular armatures 112a-c; however, the channels 114a-c may be formed by any suitable mechanism including channels cut into a puck-like structure as described in greater detail in reference to FIGS. 4A and 4B below.

The water exchange device 100 mounts to the birdbath 102 via a stationary mount (e.g., a clamp and threaded pipe, as shown) 118, and water is directed to the water exchange device 100 via a conduit 120 disposed in the hollow pedestal 108. For example, as shown, the conduit 120 is a flexible piece of hose; however, a metal pipe, a polyvinyl chloride (PVC) pipe, etc. may be used instead. Even though the mount 118 is stationary, the height of the mount may be adjusted, as described below, to adjust the height of the turret.

The conduit 120 directs water to an inlet channel 122 of the water exchange device 100, and the inlet channel 122 directs the water to the channels 114a-c. The channels are formed in such a way any water discharged through the apertures 116a-c of the channels 114a-c and into the basin 104 of the birdbath 102 will be directed on a path that does not extend radially out from a center point 124 of the turret 110. Further, the channels 114a-c are coupled to the turret 110; as such, the discharged water causes the turret 110 to rotate around the center point in response to the natural thrust of the water.

Figure 2:
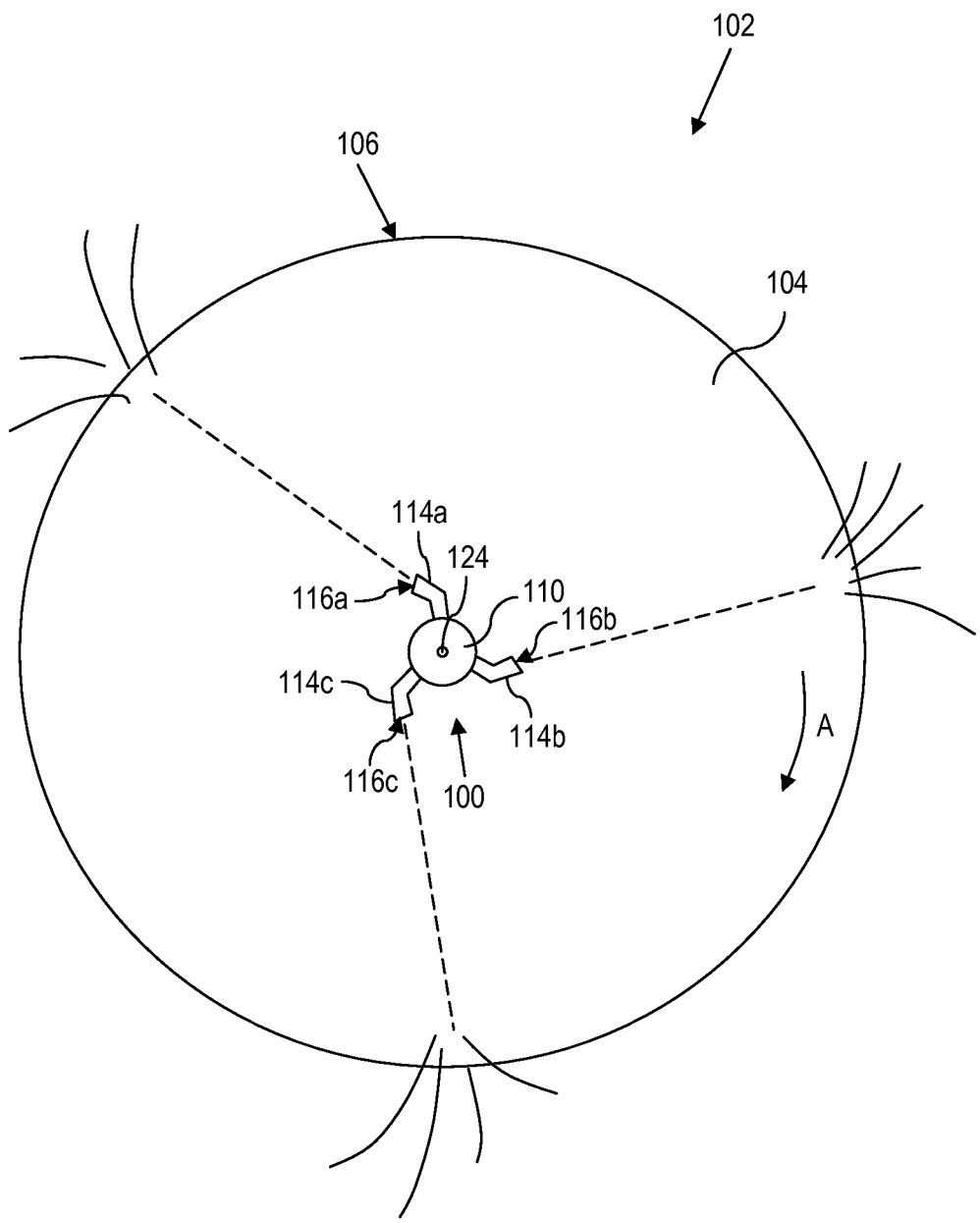
FIG. 2 is a top view of the water exchange device of FIG. 1 illustrating rotation of the water exchange device, according to various aspects of the present disclosure.

Any method can be used to ensure the channels 114a-c do not discharge the water radially. For example, FIG. 2 illustrates an example water exchange device 100 where the channels 114a-c may initially extend radially outward from the center point 124 and then bend in the same direction (e.g., counterclockwise) and at a slight downward angle. Thus, when the water discharges from the apertures 116a-c of the channels 114a-c (non-radially from the center point 124), the turret 110 rotates around the center point 124 in a clockwise direction (as shown by arrow A). If the channels 114a-c bend in the clockwise direction, then the turret 110 will rotate in the counterclockwise direction.

Turning back to FIG. 1, a second example arrangement of the channels 114a-c is shown. In FIG. 1, the channels 114a-c are coupled to the turret 110 tangentially (or secantly, or never intersecting) and not ever radially from the center point 124. Thus, when the water discharges from the apertures 116a-c of the channels 114a-c (non-radially from the center point 124), the turret 110 will rotate around the center point 124 depending on the positioning of the channels 114a-c.

As can be seen from the example water discharge devices 100 of FIGS. 1 and 2, the water is discharged into the birdbath 102 near the rim 106 of the basin 104 (i.e., the maximum water level surface of the basin 104 inside a ring generally defined by the radius of two-thirds of the radius of the basin 104 and the rim 106 of the basin 104 (i.e., an outer third of the basin 104)) due to the slight downward angle. Moreover, the mount 118 adjustable such that the height of the turret 110 in relation to the rim 106 can be adjusted to allow the discharged water to hit the basin 104 near the rim 106 of the basin 104 at the maximum water level surface. For example, the threaded mount 118 can be adjusted in the basin 104 to set the height of the turret 110.

Further, other configurations of the channels 114-c may be applied. For example, the first channel 114a may be angled downward at a steep angle such that water discharged from the aperture 116a of the first channel 114a hits inside the maximum water level surface of the basin 104 inside a circle defined by a radius of approximately one-third of the radius of the basin 104 (i.e., an innermost third of the basin 104). Further, the second channel 114b may be angled downward at a less steep angle such that water discharged from the aperture 116b of the second channel 114b hits the maximum water level surface of the basin 104 inside a ring generally defined by the radius of one-third of the radius of the basin 104 and a radius of two-thirds of the radius of the basin 104 (i.e., a middle third of the basin 104). Moreover, the third channel 114c may be angled downward at a narrow angle such that water discharged from the aperture 116c of the third channel 114c hits the maximum water level surface of the basin 104 inside a ring generally defined by the radius of two-thirds of the radius of the basin 104 and the rim 106 of the basin 104 (i.e., an outer third of the basin 104). Such a configuration may also be applied to embodiments implementing the puck-like structure, as described in FIGS. 4A and 4B below.

Thus, the water exchange device 100 can be used to perform a water exchange cycle in two parts: an emptying cycle and a refill cycle. During the emptying cycle, water is discharged from the channels 114a-c for a predetermined period of time to quickly dilute contaminated water with fresh water, while at the same time propelling contents of the basin 104 (e.g., contaminated water, leaves, debris, etc.) from inner portions of the basin 104 to the rim 106 and out of the basin 104 itself. The pressure of water is sufficient to propel the contents of the basin 104 in a six foot radius, which avoids flooding conditions on the ground and provides irrigation to surrounding plants. Under certain conditions, the emptying cycle can complete in about thirty seconds.

During the emptying cycle, all of the contaminated is not necessarily propelled from the basin 104. Instead, some water may be left over, but the water exchange device 100 dilutes the water with fresh water (as mentioned above) so the water left in the basin 104 is much less contaminated.

During the refill cycle, the water exchange device 100 discharges water at a lower pressure than the emptying cycle for a predetermined period of time and fills the basin 104 with fresh water. Thus, if there is any water left in the basin 104 after the emptying cycle, the refill cycle further dilutes any contamination of the water.

The water exchange device 100 can exchange water at intervals as close as every 2 or 3 hours. Such close-interval water exchanges can prevent algae and other stain-causing agents adequate time to secure an attachment to the basin 104 surface. Thus, the water exchange device 100 prevents the basin 104 of the birdbath 102 from getting dirty. Therefore, there is no need for power washing or vigorous cleaning of the basin surface so long as the device performs water exchange cycles in close enough intervals. As such, the pressure required during the emptying cycle is much less than if the emptying cycle used water pressure to scrub a dirty basin 104, and less water is used.

Figure 3:
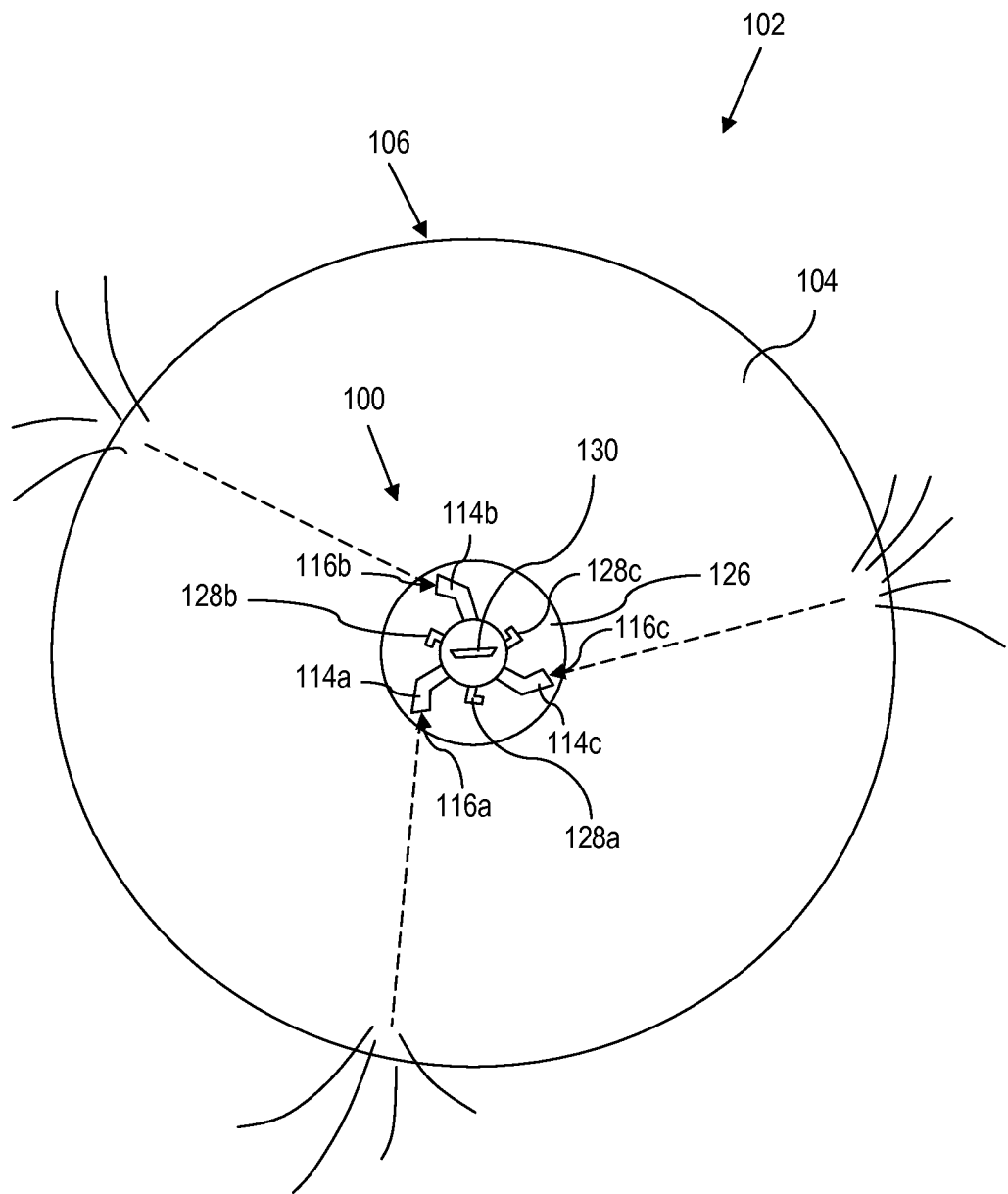
FIG. 3 is top view of an embodiment of the water exchange device of FIGS. 1-2 with inner apertures, according to various aspects of the present disclosure.

Turning now to FIG. 3, additional features of the water exchange device 100 are shown. In this example embodiment, a shroud 126 resides above the channels 114a-c and extends beyond the channels 114a-c at an outwardly down-sloped fashion. Thus, the shroud 126 prevents birds from standing between the channels 114a-c. As such, when the turret 110 starts to rotate, the birds will not get injured by the tubular armatures 112a-c (i.e., channel 114a-c).

Further, the example water exchange device 100 of FIG. 3 includes three inner apertures 128a-c in the turret 110 that are coupled to the inlet channel and aimed in a downward direction toward an innermost one-sixth of the basin 104. When these inner apertures 128a-c discharge water during an emptying cycle, the water is directed near the center of the basin 104 outward, and thus hits the maximum water level surface of the basin 104. In large or deep basins 104, this extra water flow helps the channels 114a-c propel contaminated water and debris from the basin 104. As illustrated, there are three inner apertures 128a-c; however, any number of inner apertures 128 may be present.

Moreover, the example water exchange device 100 of FIG. 3 includes a directional aperture 130 on top of the turret 108. As with the inner apertures 128a-c, the directional aperture 130 is coupled to the inlet channel such that when water flows into the inlet channel, some of the water is discharged from the directional aperture 130. Water from the directional aperture 130 discharges up to a fourteen-foot radius. As such, during the exchange cycle, the water exchange device 100 can irrigate plants up to fourteen feet away. As shown, the directional aperture 130 is a slot; however, the directional aperture 130 can be any suitable shape and number (e.g., three round holes, two slotted holed, twenty round holes, etc.). Further, the directional aperture 130 may include a cover (not shown) to prevent irrigating the fourteen-foot area when it is undesirable to do so.

These features described in FIG. 3 can go on any embodiment of the water exchange device 100 and in any configuration. For example, the puck-like structure of FIGS. 4A and 4B may include the inner channels 128 and the directional aperture 130 but not the shroud 126. As another example, the water exchange device 100 of FIG. 1 may include the shroud 126 and the directional aperture 130 but not the inner apertures 128.

Figure 4A:
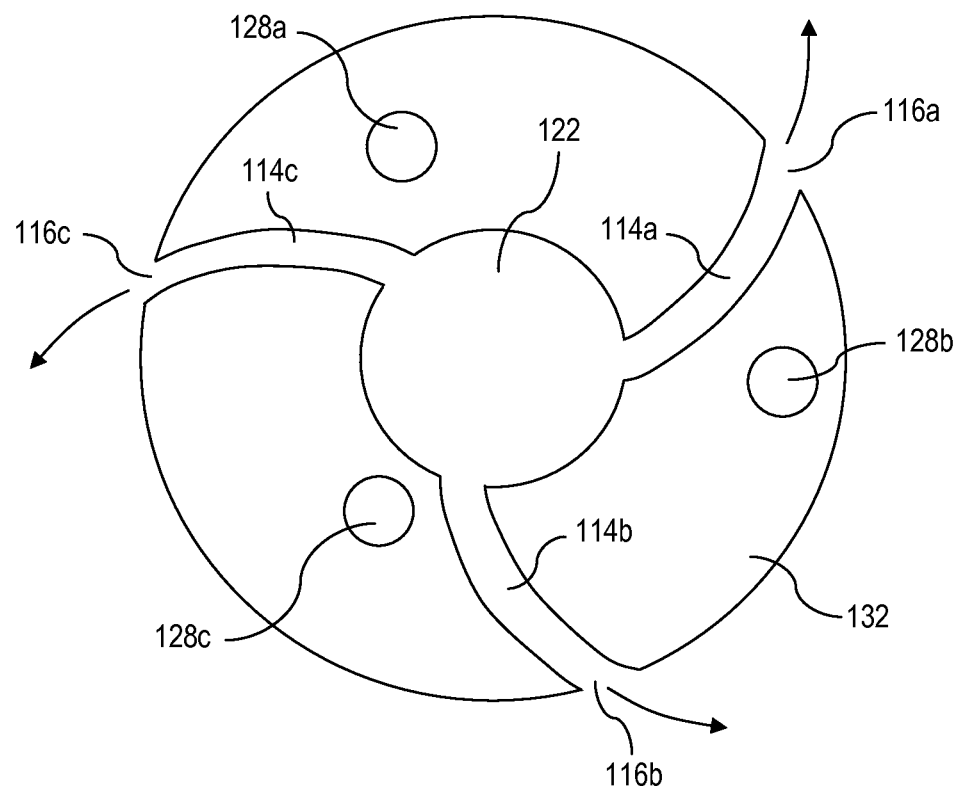
FIGS. 4A and 4B are a top-cut view and a side view of an embodiment of the water exchange device of FIG. 1 with a puck-like structure, according to various aspects of the present disclosure.
Figure 4B:
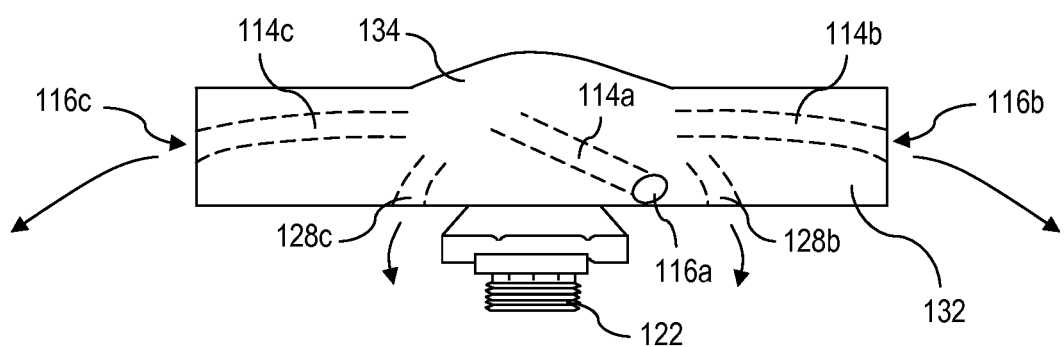

FIGS. 4A and 4B illustrate another embodiment of the water exchange device 100 including a puck-like structure 132. The puck-like structure 132 is similar in shape (if not size) to a hockey puck with a rounded central portion 134. As with the embodiments discussed in relation to FIGS. 1-3, the puck-like structure includes channels 114a-c. However, instead of tubular armatures, the channels 114a-c are cut into the puck-like structure 132 itself. Further, those channels 114a-c are cut outwardly from a general center such that the water discharged from the apertures 116a-c of the channels 114a-c is discharged non-radially from the puck-like structure 132 and at a downward angle. As with the embodiments discussed in relation to FIGS. 1-3, the channels 114a-c may be angled downwardly at different angles to hit different portions of the maximum water level surface of the basin 104 as described above, or may have the same angle as described above. The embodiments of FIGS. 4A and 4B also include the inner apertures 128; however, those inner apertures 128 are not required, as discussed above.

Figure 5:
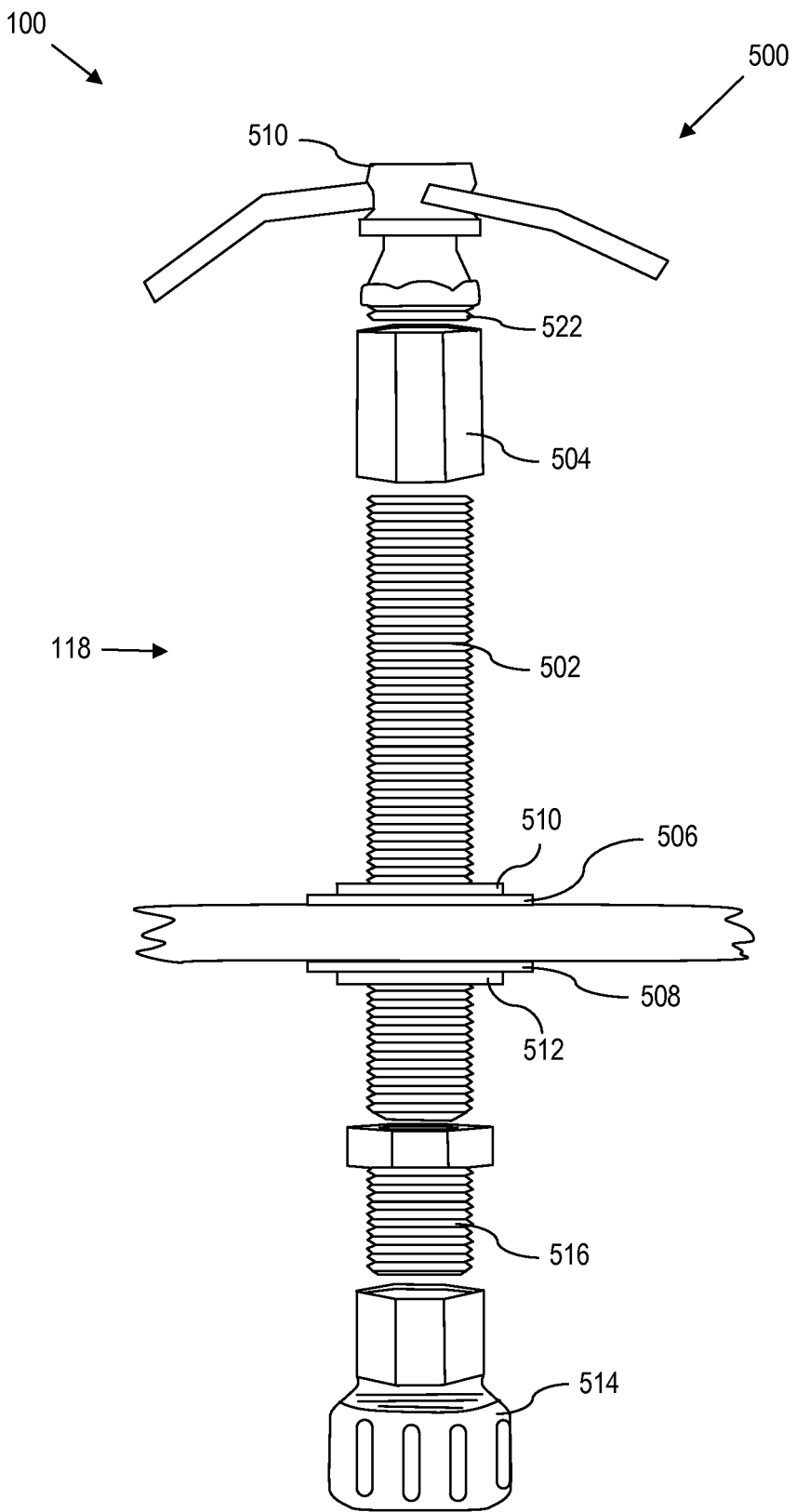
FIG. 5 is an illustration of a portion of a kit for fitting the water exchange device to a birdbath, according to various aspects of the present disclosure.
Figure 6:
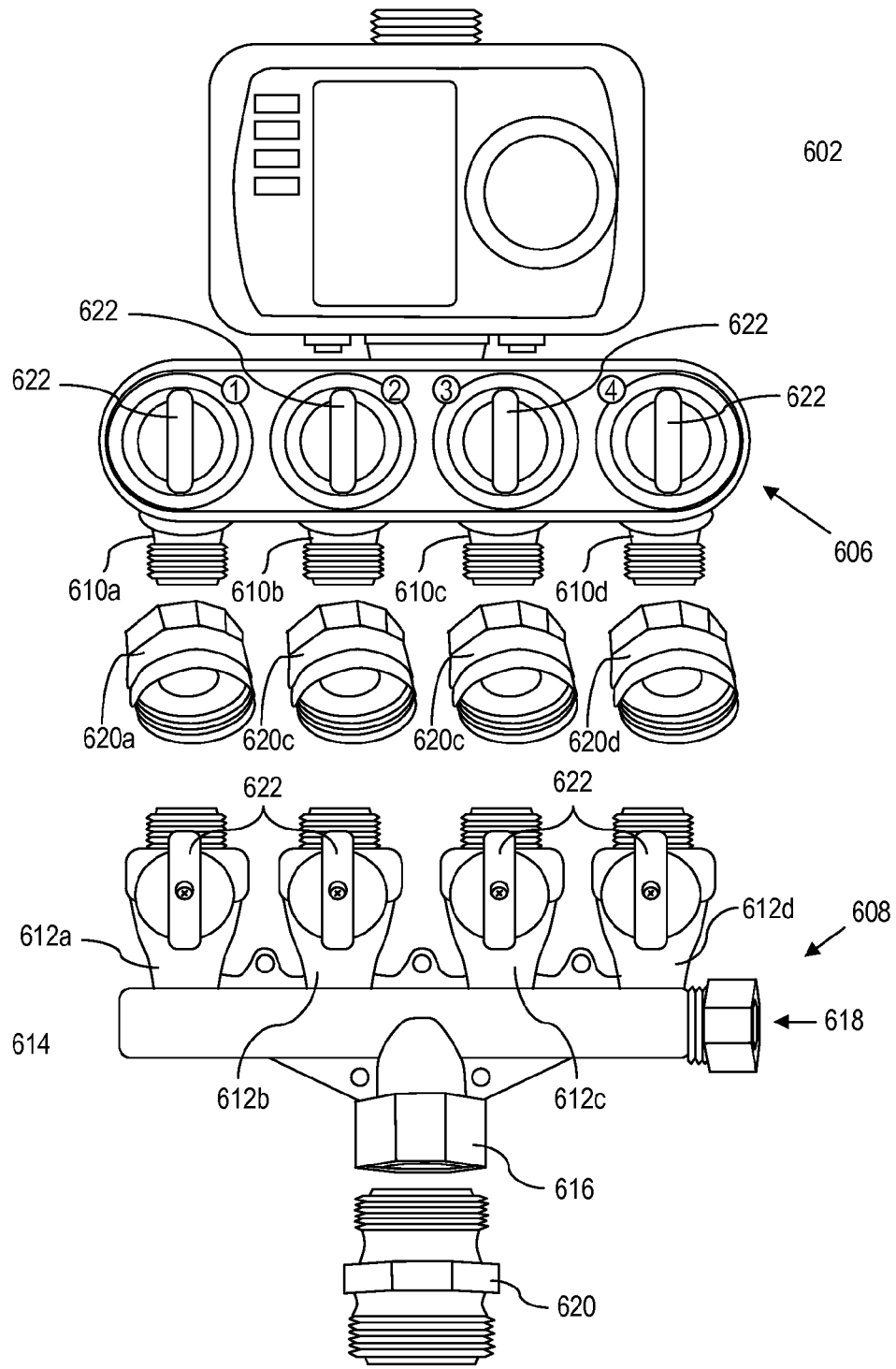
FIG. 6 is an illustration of another portion of the kit of FIG. 5, according to various aspects of the present disclosure.

FIGS. 5 and 6 illustrate a kit 500 for modifying a preexisting birdbath to perform automated water exchanges. The kit 500 includes a water exchange device 100 in any of the embodiments described above or other possible embodiments. Additionally, the kit 500 includes the mount 118, which in the example kit 500 includes a continuously threaded nipple 502. Further, the mount 118 includes a coupler 504 that couples the turret 110 to the threaded nipple 504, which is placed in a hole at the bottom of the birdbath basin 104. On both sides of the basin 104, the mount 118 includes a washer 506, 508 (galvanized steel, stainless steel, brass, etc.) and a threaded nut 510, 512 (galvanized steel, stainless steel, brass, etc.) assembly that provides a threaded passageway for the threaded nipple 504, so the nipple 502 has portions on both sides of the basin 104. The washers 506, 508 can be sealed to the basin 104 with a sealant (e.g., a silicone sealant) to prevent the basin 104 from leaking.

Also, the kit 500 can include a hose adapter 514 to couple the nipple 502 to a conduit (flexible hose, pipe, etc., as discussed above) that supplies water to the water exchange device 100. If needed, the kit also includes resizing (e.g., reducing, expanding) coupling 516 to match the size of the conduit to the size of the nipple 502.

In the example kit 500, the water exchange device 100 includes channels of bent, tubular armatures and further includes an inlet channel 122 with an outer threaded diameter of ⅜ inches (i.e., ⅜") (approx. 0.95 centimeters (cm)). The inlet channel 122 couples to the example brass threaded nipple 502, which is also ⅜", via a ⅜" brass coupler 518. The nut 510 on the top of the basin 104 is a brass nut having a size and internal thread that matches the size and external thread of the brass nipple 502, and the washer 506 is a brass washer coupled between the brass nut 510 and the basin 104. The nipple 502 extends through the basin 104 and further couples to the basin by a matching brass nut/washer 512/508 assembly similar to the nut 510 and washer 506 above the basin 104. The example resizing coupling 516 is a galvanized reducing coupling that couples the ⅜" nipple 502 to the hose adapter 514, which is a ¾" swivel garden hose adapter. The brass nuts 510, 512 matching the size and thread of the nipple 502 are tightened both below and above the basin 104 so as to make a firm attachment at the center of the basin 104.

Turning now to FIG. 6, the kit 500 further includes a timer 602 coupled to a flow controller 604 having a splitter 606 and a combiner 608. The timer 602 controls the flow controller 604 to allow water from a water source to flow into one channel 610a-c of the splitter 606 or to block the water from reaching any channel 610a-c of the splitter 606. As shown, the timer 602 is integrated into the splitter portion 606 of the flow controller 604; however, the timer 602 may be a separate component that couples to the flow controller 604. Further, as shown, the timer 102 controls the water to the splitter channels 610a-d; however, the timer may instead control the flow allowed to pass from channels 612a-d. The timer 602 is configured to control the flow controller 604 to perform the exchange cycle (described above).

The splitter 606 includes several channels 610a-d, and the timer 602 controls when water is passed to an individual channel 610a-d. As shown, the splitter 606 includes four channels 610a-d; however, the splitter 606 may include any number of channels 610. Thus, the splitter 606 can split the flow of water from a central point to one or more channels 610a-d, depending on the control from the timer 602.

The combiner 608 includes several channels 612a-d and combines the flow from the channels 612a-d (even if flow is present in only one channel 612) to a common channel 614. As shown, the combiner 608 includes four channels 612a-d; however, the combiner 608 may include any number of channels 612. Also, the combiner 608 is shown with two outlets 616, 618 from the common channel 614; however, any number of outlets from the common channel 614 may be present in the combiner 608.

The first splitter channel 610a is coupled to the first combiner channel 612a, the second splitter channel 610b is coupled to the second combiner channel 612b, and so on. As shown, the splitter 606 and combiner 608 are two separate pieces; however, the splitter 606 and combiner 608 may be one integral piece. Also, as shown the splitter 606 has male outputs and the combiner 608 has male inputs. Thus, in the example flow controller, the splitter channels 610a-d couple to the combiner channels 612a-d via a connector 620a-d with female couplings on both sides.

Moreover, one or more of the splitter channels 610a-d, one or more of the combiner channels 612a-d, or both may have a flow reducer 622 (e.g., valve, rubber washer, O-ring, etc.) that reduce the flow of water from the water source based on a signal from the timer 602. For example, the first splitter channel 610a may include a flow reducer 622 that reduces the flow, which in turn reduces the water pressure as the water is discharged during an emptying cycle. Further, the second splitter channel 610b may have a flow reducer 622 that reduces the flow further such that the water pressure during a refill cycle is less than the pressure during the emptying cycle. As such, when the timer 602 determines that it is time for an exchange cycle, the timer 602 can allow water to flow through the first splitter channel 610a during the emptying cycle. After the emptying cycle is complete, the timer 602 can allow water to flow through the second splitter channel 610b during the refill cycle.

For example, the timer 602 may be an off-the-shelf timer such as a Melnor® Model 3280 four-outlet, battery operated timer. Such a timer allows for three separate operations for every channel in a twenty-four-hour period. An exchange cycle includes at least two operations: an emptying cycle and a refill cycle. Thus, there can be up to six exchange cycles per day using the Melnor timer. Thus, if the water exchange device 100 is to be operated over a twelve-hour daylight period (the typical time birds are active), then the water exchange device 100 can perform six exchange cycles spaced about two to three hours apart. With such a small interval of time between cycles, the water does not get a chance to become overly contaminated and refuse and algae does not have time to adhere to the basin of the birdbath.

Further, the kit 500 may include a siphon (not shown) that is configured to allow water left in the water exchange device 100 after the refill cycle to drain from the water exchange device 100 so the device will not freeze if the temperature reaches below freezing. The timer 602 and flow controller 604 may be coupled to the birdbath and water source by any appropriate conduit (e.g., hose, pipe, etc.).

Thus, the water exchange device 100 and kit 500 do not require complicated mechanisms such as solenoid valves, submerged spray nozzles, etc. to perform a water exchange cycle. The spinning arms and apertures are suspended entirely above water level, and the water exchange device propels the water from the basin such that no flooding conditions occur near the basin.

While the water exchange device 100 described above is discussed as retrofitting an existing birdbath with a basin and a hollow pedestal, the water exchange device 100, in any embodiment (including, but not limited to, the puck-like structure of FIG. 4, the embodiment of FIG. 1, the embodiment of FIG. 2, etc.), can be integrated directly into a birdbath.

Figure 7:
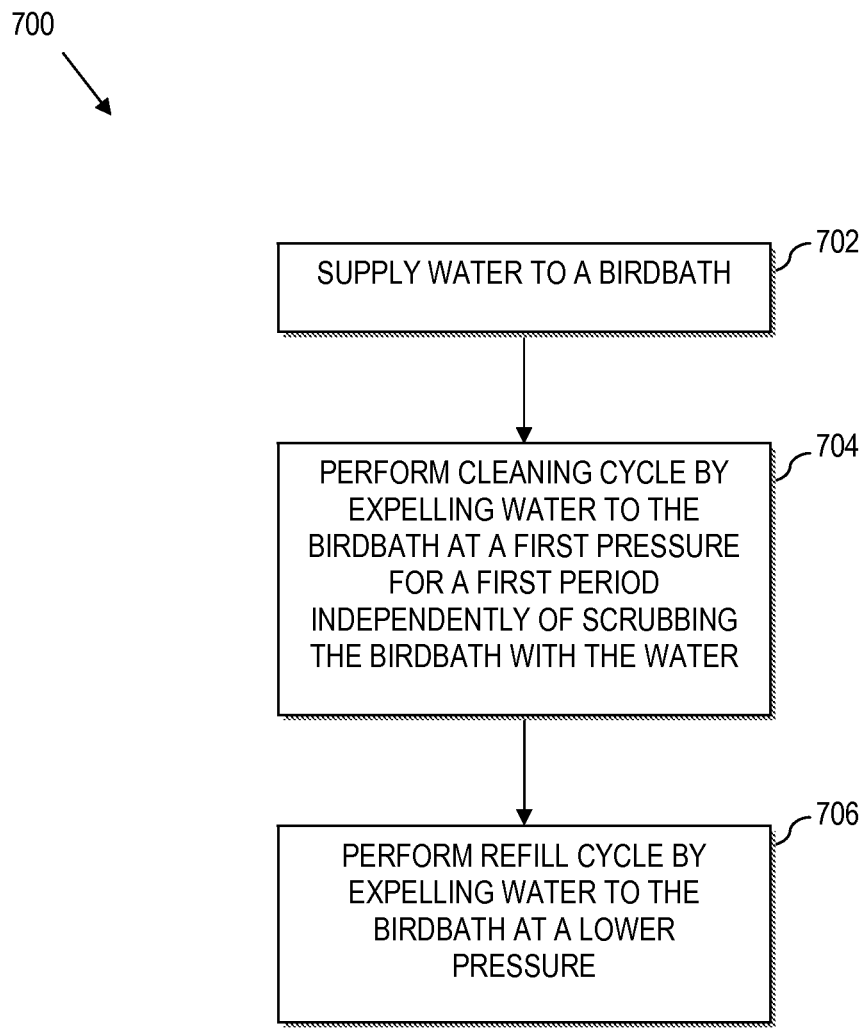
FIG. 7 is a flow chart illustrating a method for cleaning a birdbath, according to various aspects of the present invention.

FIG. 7 is a flow chart illustrating a process 700 for cleaning a birdbath. At 702, water is supplied from a water source to the birdbath via a conduit. As mentioned above, a timer and flow controller reside between the water source and the water exchange device mounted on the birdbath. At 704, an emptying cycle is performed. The emptying cycle discharges water at a first pressure for a first predetermined period of time. That first pressure is sufficient enough to move debris and contaminated water out of the birdbath basin (or dilute the water as described above). However, the first pressure does not scrub the basin, which wastes water.

At 706, a refill cycle is performed. The refill cycle discharges water at a second pressure, less than the first pressure, for a second predetermined period of time. The predetermined period of time for the emptying cycle may be identical to the predetermined period of time for the refill cycle, but it is not necessary.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Aspects of the disclosure were chosen and described in order to best explain the principles of the disclosure and the practical application, and to enable others of ordinary skill in the art to understand the disclosure for various embodiments with various modifications as are suited to the particular use contemplated.

What is claimed is:

1. A water exchange device for maintaining a birdbath, the water exchange device comprising:
    a turret rotatably coupled to a center point;
    a stationary mount that mounts the turret of the water exchange device to the birdbath;
    a first channel passing through the turret, wherein the first channel extends substantially horizontally from the center point of the turret and includes a first aperture exiting the turret;
    a second channel passing through the turret, wherein the second channel extends substantially horizontally from the center point of the turret and includes a second aperture exiting the turret; and
    an inlet channel coupled to the first channel and the second channel;
    wherein:
    the first channel and the second channel direct water introduced into the inlet channel into a basin of the birdbath at a non-radial, downward angle; and
    the turret rotates around the center point when water is introduced into the inlet channel and discharged through the first aperture and the second aperture.

2. The water exchange device of claim 1 further including:
    at least two inner apertures such that when the water exchange device is installed in the birdbath, the at least two inner apertures are aimed at an innermost portion of a maximum water level surface of the basin.

3. The water exchange device of claim 1, wherein the mount is adjustable such that a height of the turret can be adjusted to allow discharged water to hit a maximum water level surface of the basin near a rim of the basin.

4. The water exchange device of claim 1, wherein the stationary mount comprises a clamp and threaded pipe.

5. The water exchange device of claim 1, wherein the first channel extends substantially horizontally from the center point of the turret by extending radially outward from the center point, bends in a clockwise direction, and bends at a downward angle within the turret so that the first aperture enables water to exit the turret non-radially from the center point.

6. The water exchange device of claim 1, wherein the first channel extends substantially horizontally from the center point of the turret by extending radially outward from the center point, bends in a counter-clockwise direction, and bends at a downward angle within the turret so that the first aperture enables water to exit the turret non-radially from the center point.

7. The water exchange device of claim 1, wherein the first channel extends substantially horizontally from the center point of the turret by extending non-radially outward from the center point to the first aperture.

8. The water exchange device of claim 1 further comprising a directional aperture on top of the turret.

9. The water exchange device of claim 1, wherein:
the turret further includes a puck-like structure;
the first channel is a channel cut into the puck-like structure; and
the second channel is a channel cut into the puck-like structure.

10. The water exchange device of claim 9 further including:
at least two inner apertures such that when the water exchange device is installed in the birdbath, the at least two inner apertures are aimed at an innermost portion of a maximum water level surface of the basin.

11. The water exchange device of claim 9 further including a third channel with a third aperture exiting the turret; wherein:
the third channel is a channel cut into the puck-like structure; and
the first channel, second channel, and third channel are cut into the puck-like structure outwardly from a general center such that water discharged from the first aperture, second aperture, and third aperture is discharged non-radially from the puck-like structure and at a downward angle.

12. The water exchange device of claim 11, wherein:
the first channel is angled downward such that water discharged from the first aperture hits a maximum water level surface of the basin inside a circle generally defined by a radius of approximately one-third of a radius of the basin;
the second channel is angled downward such that water discharged from the second aperture hits the maximum water level surface of the basin inside a ring generally defined by a radius of one-third of the radius of the basin and a radius of two-thirds of the radius of the basin; and
the third channel is angled downward such that water discharged from the third aperture hits the maximum water level surface of the basin inside a ring generally defined by the radius of two-thirds of the radius of the basin and the rim of the basin.

13. The water exchange device of claim 11, wherein the first channel, second channel, and third channel are angled downward such that water discharged from the aperture of the third channel hits a maximum water level surface of the basin inside a ring generally defined by a radius of two-thirds of a radius of the basin and the rim of the basin.

14. A kit for modifying a birdbath to perform automated water exchanges, the kit comprising:
a water exchange device comprising:
a turret rotatably coupled to a center point;
a stationary mount that mounts the turret of the water exchange device to the birdbath;
a first channel passing through the turret, wherein the first channel extends substantially horizontally from the center point of the turret and includes a first aperture exiting the turret;
a second channel passing through the turret, wherein the second channel extends substantially horizontally from the center point of the turret and includes a second aperture exiting the turret; and
an inlet channel coupled to the first channel and the second channel;
wherein:
the first channel and the second channel direct water introduced into the inlet channel into a basin of the birdbath at a non-radial, downward angle; and
the turret rotates around the center point when water is introduced into the inlet channel and discharged through the first aperture and the second aperture;
a flow controller that is configured to control flow of the water from an associated water source;
a timer that is configured to control the flow controller; and
a conduit adapted to couple the water exchange device to the water source.

15. The kit of claim 14, wherein the flow controller further includes a flow reducer configured to reduce the flow of water from the water source based on a signal from the timer.

16. The kit of claim 14, wherein:
the flow controller further includes:
a splitter including a first channel and a second channel, wherein the splitter is configured to split the flow of the water to flow to the first channel and the second channel; and
a combiner including a first channel and a second channel, wherein the combiner is configured to combine the first channel and second channel to a common channel;
the timer is configured to control the flow controller to direct water to select one of:
allow the water to flow to the first channel of the splitter;
allow the water to flow to the second channel of the splitter; and
block the water from both the first channel of the splitter and the second channel of the splitter;
the first channel of the splitter is coupled to the first channel of the combiner; and
the second channel of the splitter is coupled to the second channel of the combiner.

17. The kit of claim 16, wherein:
the splitter further includes a third channel and a fourth channel, wherein the splitter is further configured to further split the flow of the water to flow to the third channel and the fourth channel; and
the combiner further includes a third channel and a fourth channel, wherein the combiner is configured to combine the third channel and fourth channel to the common channel;
the timer is configured to control the flow controller to direct water to select one of:
allow the water to flow to the first channel of the splitter;
allow the water to flow to the second channel of the splitter;
allow the water to flow to the third channel of the splitter;
allow the water to flow to the fourth channel of the splitter;
block the water from all the channels of the splitter;
the third channel of the splitter is coupled to the third channel of the combiner; and
the fourth channel of the splitter is coupled to the fourth channel of the combiner.

18. The kit of claim 14, wherein:
the timer is further configured to control the flow controller to perform an exchange cycle comprising an emptying cycle followed by a refill cycle;
wherein:

the emptying cycle comprises supplying water from the water source to the water exchange device at a first pressure for a first predetermined period; and the refill cycle comprises supplying water from the water source to the water exchange device at a second pressure for a second predetermined time period.

19. The kit of claim 18, wherein the timer is further configured to control the flow controller to perform six exchange cycles every day.

20. A birdbath comprising:
a basin with a rim; and
a water exchange device mounted to the basin, the water exchange device comprising:
 a turret rotatably coupled to a center point;
 a first channel passing through the turret, wherein the first channel extends substantially horizontally from the center point of the turret and includes a first aperture exiting the turret;
 a second channel passing through the turret, wherein the second channel extends substantially horizontally from the center point of the turret and includes a second aperture exiting the turret; and
 an inlet channel coupled to the first channel and the second channel;

wherein:
 the first channel and the second channel direct water introduced into the inlet channel into a basin of the birdbath at a non-radial, downward angle; and
 the turret rotates around the center point when water is introduced into the inlet channel and discharged through the first aperture and the second aperture.

21. The birdbath of claim 20, wherein:
the water exchange device further comprises a third channel with an aperture;
the turret of the water exchange device further includes a puck-like structure;
the first channel of the water exchange device is a channel cut into the puck-like structure;
the second channel of the water exchange device is a channel cut into the puck-like structure;
the third channel of the water exchange device is a channel cut into the puck-like structure; and
the first channel, second channel, and third channel are cut into the puck-like structure outwardly from the center point such that the water discharged from the apertures of the channels is discharged non-radially from the puck-like structure and at a downward angle.

* * * * *